United States Patent
Gerez et al.

(10) Patent No.: US 8,528,317 B2
(45) Date of Patent: Sep. 10, 2013

(54) METHOD AND SYSTEM FOR DETECTING THE INGESTION OF AN OBJECT BY AN AIRCRAFT TURBINE ENGINE DURING A MISSION

(75) Inventors: Valerio Gerez, Yerres (FR); Claude Alain Mazur, Evry (FR)

(73) Assignee: SNECMA, Paris (FR)

( * ) Notice: Subject to any disclaimer, the term of this patent is extended or adjusted under 35 U.S.C. 154(b) by 532 days.

(21) Appl. No.: 12/859,806

(22) Filed: Aug. 20, 2010

(65) Prior Publication Data
US 2011/0041474 A1 Feb. 24, 2011

(30) Foreign Application Priority Data
Aug. 21, 2009 (FR) ...................................... 09 55735

(51) Int. Cl.
*F02K 9/38* (2006.01)
*B64D 33/02* (2006.01)

(52) U.S. Cl.
USPC ...... 60/223; 60/39.091; 60/39.092; 60/226.1; 244/53 B

(58) Field of Classification Search
USPC .... 60/39.091, 39.092, 223, 226.1; 244/53 B; 55/306; 415/121.1, 121.2; 250/330–334, 250/338.1, 338.4, 208.2, 214.1, 214 R, 206, 250/201.1
See application file for complete search history.

(56) References Cited

U.S. PATENT DOCUMENTS

| | | | | |
|---|---|---|---|---|
| 4,092,537 A * | 5/1978 | Stewart | ........................... | 378/51 |
| 4,888,948 A * | 12/1989 | Fisher et al. | .................... | 60/223 |
| 6,092,008 A | 7/2000 | Bateman | | |
| 6,668,655 B2 * | 12/2003 | Harrold et al. | .................. | 73/660 |

FOREIGN PATENT DOCUMENTS

| | | |
|---|---|---|
| JP | 2006-203688 | 8/2006 |
| JP | 2009-105564 | 5/2009 |
| WO | WO 02/103199 A2 | 12/2002 |

\* cited by examiner

*Primary Examiner* — Ehud Gartenberg
*Assistant Examiner* — Karthik Subramanian
(74) *Attorney, Agent, or Firm* — Oblon, Spivak, McClelland, Maier & Neustadt, L.L.P.

(57) ABSTRACT

A method and a system for detecting the ingestion of an object by an aircraft turbine engine during a mission is disclosed. The method includes: acquiring during the mission digital images of the operating fan of the turbine engine, these images being acquired at an acquisition frequency proportional to the speed of rotation of the fan and to the number of blades of the fan; identifying the different phases of the mission of the aircraft for each phase of the mission; comparing the images of the fan with at least one reference image corresponding to sound operation of the fan; and, if necessary, identifying each abnormal image of the fan which differs from the corresponding reference image, the identification of an abnormal image of the fan corresponding to the crossing of an alert level for detecting the ingestion of an object by the turbine engine.

15 Claims, 3 Drawing Sheets

Figure 1:
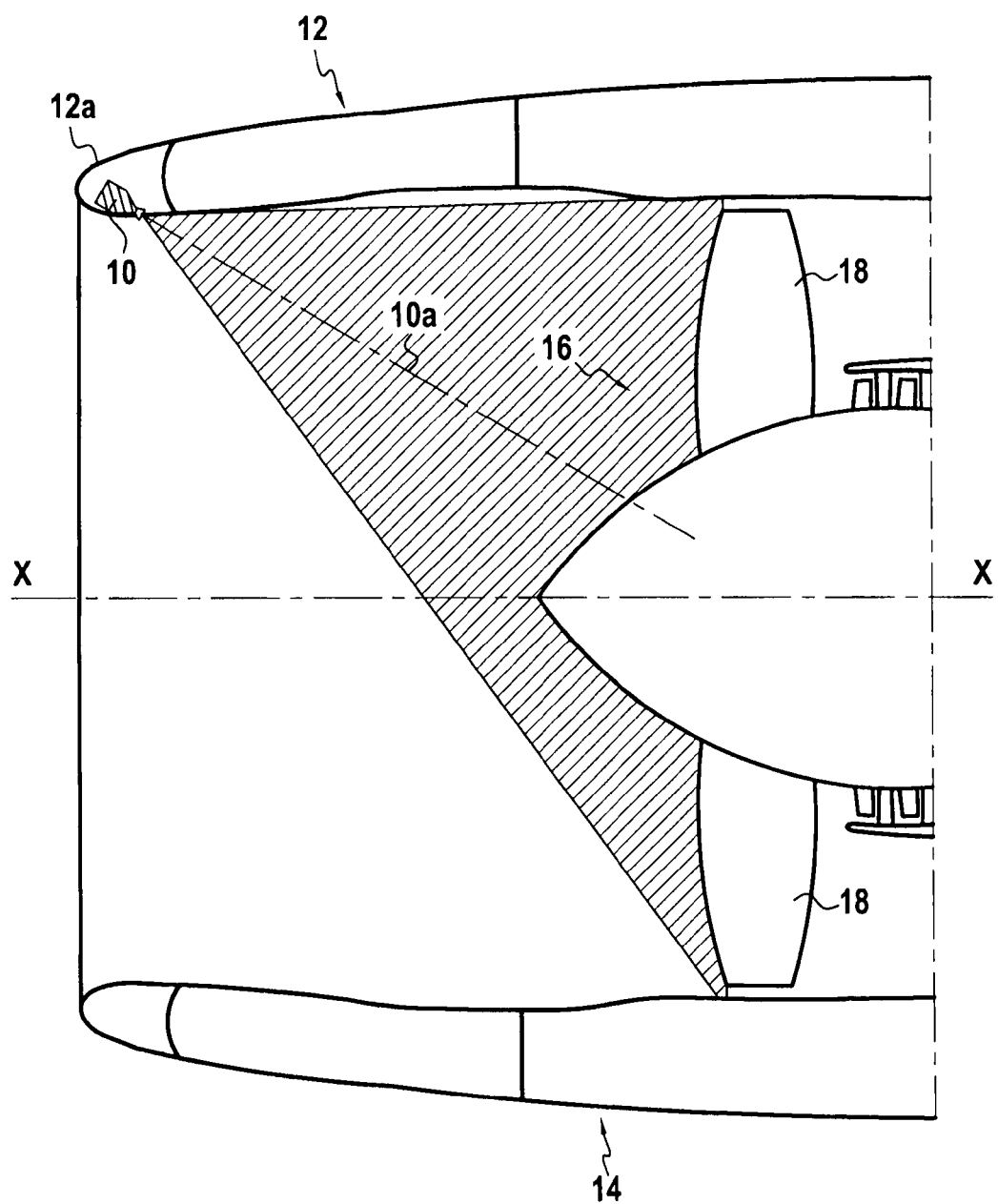

METHOD AND SYSTEM FOR DETECTING THE INGESTION OF AN OBJECT BY AN AIRCRAFT TURBINE ENGINE DURING A MISSION

BACKGROUND OF THE INVENTION

The present invention relates to the general field of monitoring a turbine engine. More specifically, it is directed to a method and system allowing automatic detection of ingestion of an object by an aircraft turbine engine during a mission.

During a mission, it is possible that foreign bodies or parts detached from the turbine engine, are ingested by the turbine engine and cause deterioration inside the latter. In particular, the impact of an object on a fan blade risks damaging the latter. In the case of deteriorations due to the ingestion of bodies foreign to the turbine engine (for example birds), one refers to FOD (<<Foreign Object Damage>>). In the case of deteriorations due to the ingestion of parts detached from the turbine engine (for example rivets, bolts, etc.), one rather refers to DOD (<<Domestic Object Damage>>).

Different known solutions exist for detecting the presence of FOD or DOD. One of these solutions is based on a measurement of the vibrations of one of the rotors of the turbine engine in order to detect the occurrence of an unbalance consecutive to the damaging of the latter by ingestion of an object. In the case of detection of unbalance, visual inspection of the turbine engine (by endoscopy for example) is carried out on the ground: the presence of impact traces, of bird feathers or of pockets on the blades at the location of the impact then allows diagnosing the presence of FOD or DOD.

Such a solution has many drawbacks. It is notably incapable of detecting the presence of FOD or DOD which do not lead to any unbalance on the rotors of the turbine engine (or to an unbalance which is too small to be detected). Moreover, endoscopic inspection of the turbine engine requires ground intervention which has to be programmed in advance and which may be tedious.

Another known solution consists of using measurement instruments loaded on-board the aircraft for detecting the presence of FOD or DOD. Thus, a turbine engine monitoring method is known from document US 2007/0250245 allowing quasi-instant detection of whether a foreign body has damaged the turbine engine. For this purpose, this method provides real-time comparison of the vibratory level of a rotor of the turbine engine with a predefined threshold. In the case of this threshold being exceeded over a predetermined period, a maintenance alert is emitted.

This method however has many disadvantages. In particular, in order that a maintenance alert be emitted, it is required that exceeding of the threshold occurs over a minimum period. There are therefore risks that certain FODs or DODs are not detected by this method.

More generally, the different known solutions for detecting FOD or DOD do not give the possibility of analyzing in real time the consequences of this ingestion on the blades of the fan.

OBJECT AND SUMMARY OF THE INVENTION

The main object of the present invention is therefore to overcome such drawbacks by proposing a reliable solution for detecting FOD or DOD.

This object is achieved by means of a method for detecting the ingestion of an object by an aircraft turbine engine during a mission, the method including the steps of:

(a) acquiring during the mission of the aircraft, digital images of the operating fan of the turbine engine, these images being acquired at an acquisition frequency proportional to the speed of rotation of the fan and to the number of blades of the fan;

(b) identifying the different phases of the mission of the aircraft;

(c) for each phase of the mission, comparing the images of the operating fan, acquired for this phase of the mission with at least one reference image corresponding to sound operation of the fan for this phase of the mission;

(d) if necessary, identifying each abnormal image of the operating fan which differs from the corresponding reference image, the identification of an abnormal image of the operating fan corresponding to the crossing of an alert level for detecting the ingestion of an object by the turbine engine.

The method according to the invention has the particularity of resorting to digital images of the operating fan, acquired at an acquisition frequency proportional to the speed of rotation of the fan and to the number of blades of the fan. By comparing these digital images with prerecorded images of the fan and associated with sound operation of the latter (i.e. in an operation for which it is certain that it occurred without any FOD or DOD), it is thereby possible to determine in real time and with great reliability whether an object is ingested by the operating turbine engine.

The simple information that an object is ingested by the operating turbine engine is however not always sufficient per se. Also, in a particularly advantageous way, the method, following the crossing of the alert level for detecting the ingestion of an object by the turbine engine, further includes:

(e) analyzing the abnormal image(s) of the operating fan in order to check on the latter for a plurality of viewing criteria of the ingestion of an object by the turbine engine and its consequences on the fan of the latter.

The plurality of criteria used during the step (e) preferably comprises a set of criteria related to the viewing of an object in the turbine engine upstream from the fan, a set of criteria related to the viewing of a phenomenon of deformation of one or more blades of the fan, and a set of criteria related to the viewing of the extent and attenuation over time of the phenomenon of deformation of the blade(s) of the fan.

The analysis of the abnormal images of the operating fan, is advantageously followed by a step of:

(f) establishing a diagnosis depending on the checked criteria.

The diagnosis established this step (f) preferably belongs to the following list: diagnosis of the presence in the turbine engine upstream from the fan of one or more objects, the size and speed of which are estimated, diagnosis of the presence of one or more blades of the fan in free and damped oscillations, and diagnosis of the presence of one or more blades of the fan in forced oscillations.

Finally, following the establishment of a diagnosis, the method may advantageously include a step of:

(g) emitting an alert of ingestion by the turbine engine of one or more objects.

The alert emitted during this step (g) preferably belongs to the following list: alert of ingestion by the turbine engine of an object for which the size, the mass and the density are identified, alert of ingestion by the turbine engine of an object of small size and of high density, and alert of ingestion by the turbine engine of an object of low mass and low density.

Preferably, steps (a) to (d) are carried out continuously during the mission, while steps (e) to (g) are carried out on a deferred basis.

The object of the invention is also a system for detecting the ingestion of an object by an aircraft turbine engine during a mission, the system including:

a device for acquiring during the mission of the aircraft, digital images of the operating fan of the turbine engine, these images being acquired at an acquisition frequency proportional to the speed of rotation of the fan and to the number of blades of the fan; and a computing device for identifying the different phases of the mission of the aircraft; comparing the images of the operating fan acquired during a phase of the mission with at least one reference image corresponding to sound operation of the fan for this phase of the mission; and identifying each abnormal image of the operating fan which differs from the reference images, the identification of an abnormal image of the operating fan corresponding to the crossing of an alert level for detecting the ingestion of an object by the turbine engine.

The object of the invention is further a turbine engine including a detection system as defined earlier.

SHORT DESCRIPTION OF THE DRAWINGS

Figure 2:
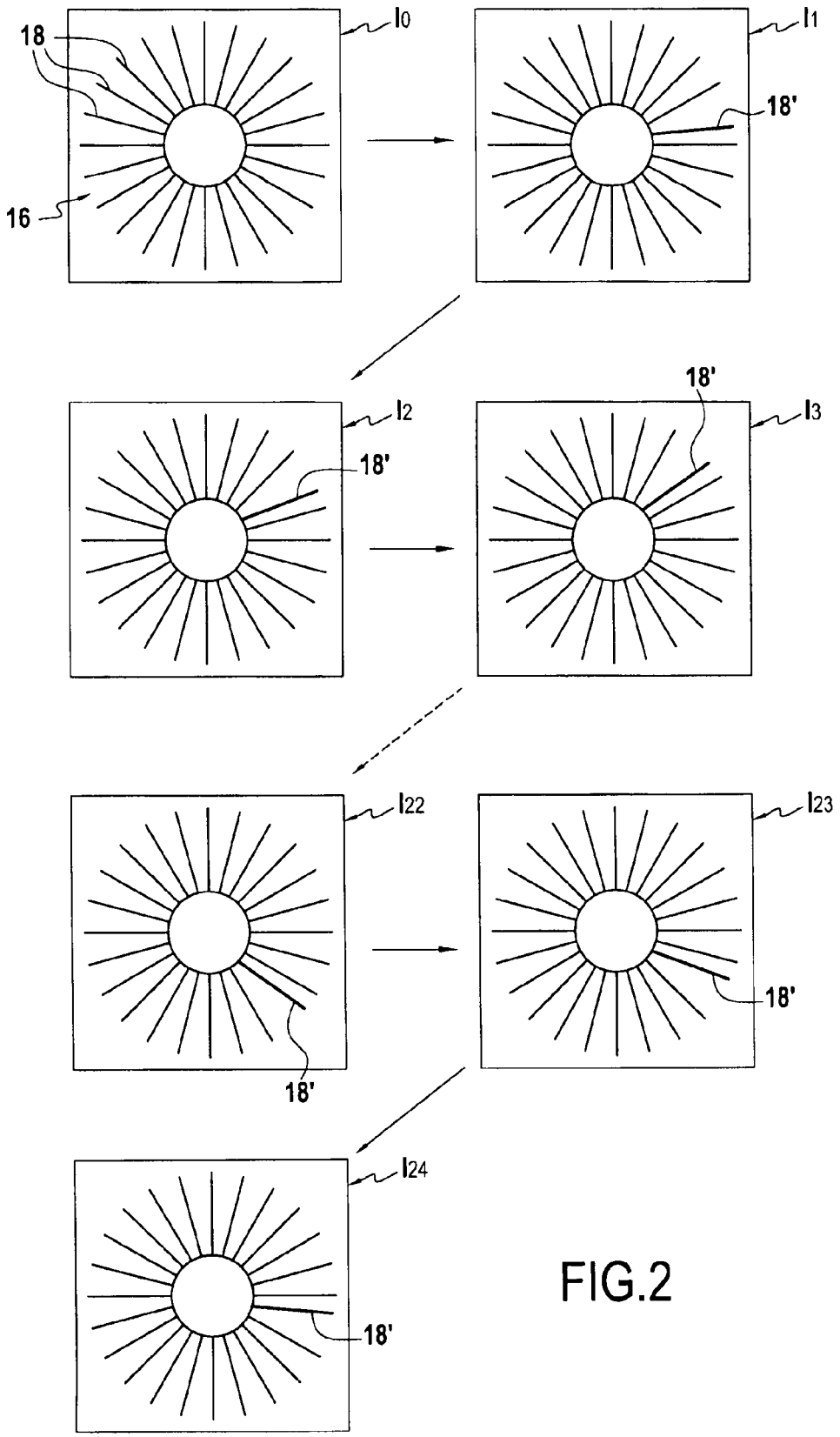
Figure 3:
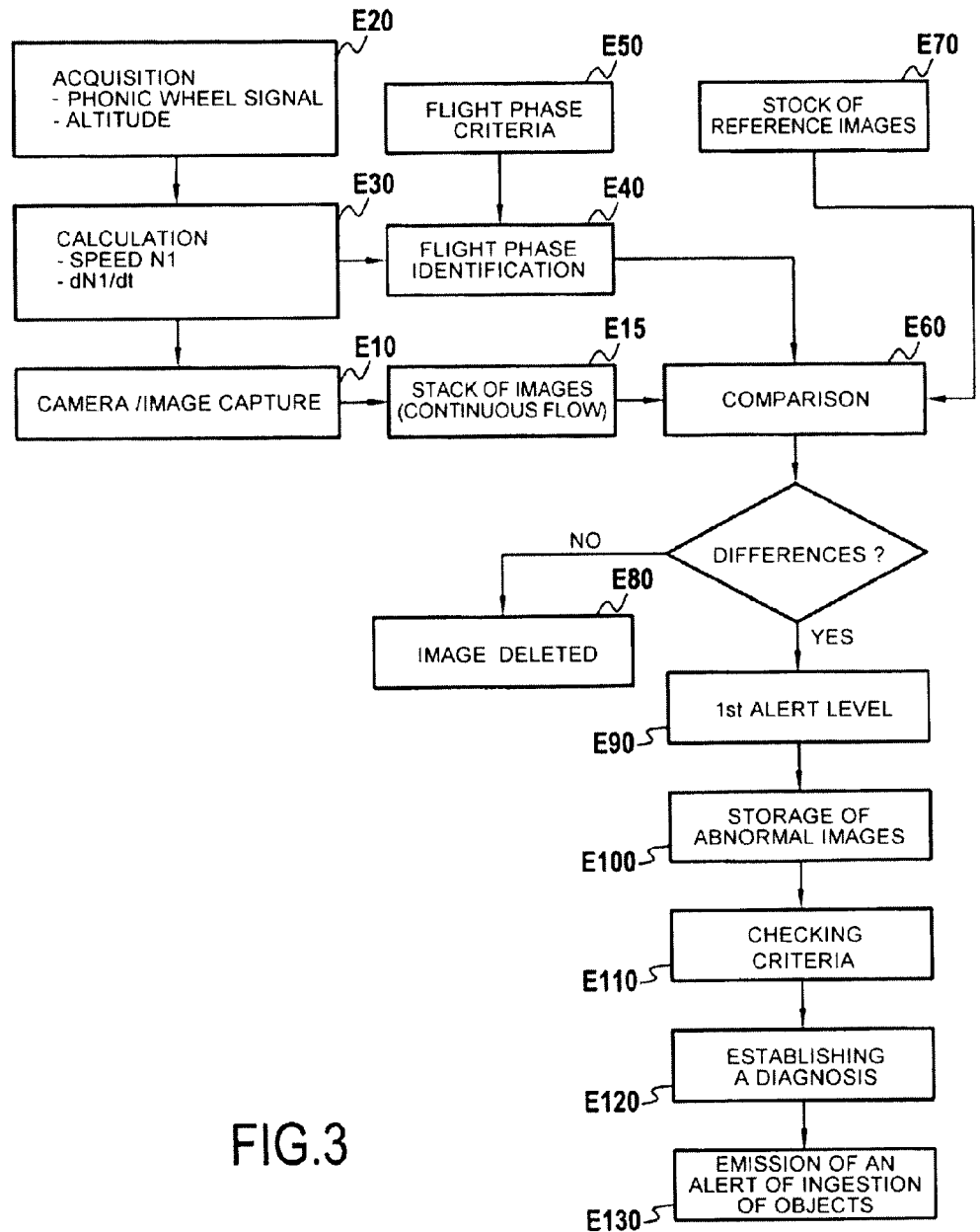

Other features and advantages of the present invention will become apparent from the description made below, with reference to the appended drawings which illustrate an exemplary embodiment thereof without any limiting feature. In the figures:

FIG. 1 is a schematic partial view of a turbine engine equipped with a detection system according to the invention;

FIG. 2 very schematically shows digital images of the fan of a turbine engine following ingestion of an object, as obtained by means of a detection system according to the invention; and FIG. 3 illustrates as a flowchart, the main steps of the detection method according to the invention.

DETAILED DESCRIPTION OF AN EMBODIMENT

The detection method and system according to the invention allows automatic detection of the ingestion by a turbine engine by an aircraft turbine of an object (foreign body or part detached from the turbine engine) during a mission.

The method is based on analysis of digital images of the operating fan of the turbine engine, these images being acquired at an acquisition frequency proportional to the speed of rotation of the fan and to the number of blades of the fan.

As illustrated in FIG. 1, these images are taken by means of a digital camera 10 which is for example installed in the intake duct 12 (and more specifically in the lip 12a of the latter) of the nacelle 14 of the turbine engine and which is directed towards the fan 16.

This digital camera 10 has the particularity of being able to acquire images at a frequency which is proportional to the speed of rotation of the fan 16 and to the number of its blades 18. More specifically, the frequency $f_a$ for acquiring images of the operating fan according to the method of the invention is given by the following equation:

$$f_a = n_a \times \frac{N_1}{60}$$

wherein $n_a$ is the number of blades 18 of the fan and $N_1$ is the speed of rotation of the fan (in rpm).

For example, for a fan consisting of twenty four blades 18 with a maximum frequency of rotation of 100 Hz, the maximum acquisition frequency of the camera will have to be 2,400 Hz (corresponding to the full throttle operating condition of the turbine engine) and the minimum acquisition frequency should be about 400 Hz (corresponding to the idle operating condition of the turbine engine). In this way, by a stroboscopic effect, the images taken of the fan will then practically always have the same aspect, i.e. that of a stopped fan (see FIG. 2, image $I_0$), and this regardless of the speed of rotation of the fan.

In order to allow the camera 10 to acquire images at a frequency which is proportional to the speed $N_1$ of rotation of the fan 16, its acquisition frequency $f_a$ has to be slaved to this speed. This servocontrol is achieved for example by detection of the <<beep>> per turn of the phonic wheel used for measuring N1. Indeed, there exist algorithms which allow detection of the passage of the teeth of the phonic wheel, and in particular that of the tooth corresponding to the <<beep>> per turn of the phonic wheel. Thus, at each beep per turn of the phonic wheel, an order for taking a picture is sent to the camera 10.

Moreover, the camera 10 for the processing of digital images is connected to an electronic computer (also called EMU (Engine Monitoring Unit)) which may be present in the aircraft (for example in the hold) or directly fitting out the turbine engine (the electronic computer is not illustrated in the figures).

Finally, the camera may, if necessary, be associated with a system for illuminating the blades of the fan (not shown in the figures) allowing night acquisition of images of the operating fan.

FIG. 2 shows very schematically the type of image which may be obtained with the digital camera 10. These images are simplified in order to facilitate understanding. In particular, these images do not take into account the tilt of the axis 10a of the camera 10 relatively to the X-X axis of the fan 16.

As indicated earlier, the image $I_0$ illustrated in this FIG. 2, shows the fan during a sound operation (i.e. in an operation for which it is certain that it took place without any object ingestion). As for the images $I_1$ to $I_{24}$, they illustrate the fan over a full turn for which a particular blade 18' has undergone deformation following the ingestion of an object by the turbine engine during a mission.

In connection with FIG. 3, the main steps of the detection method according to the invention will now be described, which are applied by the electronic computer of the turbine engine.

In the following description, by <<real time acquisition>> is meant that the collected data (digital images, speeds, altitude, etc.) are immediately transmitted to the electronic computer of the turbine engine during the mission for processing, a slight time shift may however subsist between the moment when these data are collected and the moment when they are converted by the electronic computer in order to be processed.

The detection method according to the invention first consists of acquiring in real time and continuously during the mission, digital images of the operating fan of the turbine engine (step E10), these images being provided by the digital camera described earlier.

These digital images are transmitted to the electronic computer for processing. They are more particularly stored in a memory of the electronic computer so as to form a stack of images which is fed by a continuous flow of images (E15).

In parallel with this step E10, provision is made for acquiring in real time and during the mission, data allowing identification of the different phases of the mission of the aircraft.

For this purpose, the signal of a phonic wheel interdependent in rotation with the fan and the altitude of the aircraft are transmitted to the electronic computer (step E20). From these data, the electronic computer will compute the speed $N_1$ of rotation of the fan and the time variation $dN_1/dt$ of this same speed (step E30), the speed $N_1$ being notably required for driving the acquisition frequency of the camera.

In a way known per se, the data $N_1$, $dN_1/dt$ and the altitude of the aircraft allow the electronic computer to identify the phases of the mission of the aircraft (step E40). For this purpose, the electronic computer comprises in a memory a table of criteria of phases of the mission (E50) in which are identified a plurality of phases of the mission corresponding to cutting out in time the profile of a typical mission of the aircraft. As an example, these phases of the mission may include the following phases: starting, ground idling, taxiing, taking off, ascent, cruising, descent, etc. . . . . In the criteria table of the phases of the mission, ranges of values for the data $N_1$, $dN_1/dt$ and altitude are assigned to each of these phases of the mission. Thus, by simply comparing computed and collected data during the mission with those of the criteria table of the phases of the mission, the electronic computer of the turbine engine is capable of identifying each phase of the mission of the aircraft.

The following step (E60) for each phase of the mission identified during step E40, consists of comparing the images of the operating fan acquired for this phase of the mission with at least one reference image corresponding to a sound operation of the fan for this same phase of the mission. This step E60 is preferably applied in real time, i.e. by taking the images of the operating fan stemming from the stack of images as they are gradually acquired, and continuously.

The reference images of the operating fan are digital images stored as a database in a memory of the electronic computer of a turbine engine (step E70). Each reference image represents the fan (under the same conditions of acquisition as for the images captured in step E10) operating in a normal condition, i.e. an operating condition non-affected by the ingestion of an object, and for a particular phase of the mission. Thus, for each phase of the mission of the aircraft, is associated at least one reference image of the fan showing the latter operating in a normal condition.

The reference images may be obtained during a calibration mission. In this case, the flow of images provided by the digital camera is continuous towards a memory of the electronic computer where they are stored temporarily. The criteria of the phases of the mission (altitude, speed $N_1$ of rotation of the fan and variation $dN_1/dt$) are predefined beforehand on a typical mission profile. From the calculated parameters of $N_1$ and $dN_1/dt$ from a phonic wheel, an algorithm for recognizing the phase of the mission automatically triggers the storage of reference images during the calibration mission. In the absence of any particular event on the calibration mission, the referenced images each associated with a particular phase of the mission are stored in the memory of the electronic computer. If need be, the database of the reference images may be (either manually or automatically) updated periodically depending on the dirt condition of the fan of the turbine engine.

The comparison step E60 consists of analyzing the differences between the images from the digital camera and the associated reference images. Different techniques for digital processing consisting of comparing two digital images with each other in order to distinguish the differences, may be used. They are well-known per se and they will therefore not be detailed here. An example of such processing consists of carrying out a comparison of the images pixel by pixel. For this purpose, the two digital images to be compared are superposed in order to have them coincide. By subtracting the value of the pixels, it is then possible to view the differences between both images, these differences may be compared with threshold values in order to decide on their validation or not.

At the end of the comparison step E60, the images of the operating fan not having any differences with the reference images which are associated with them, are deleted from the memory of the electronic computer of the turbine engine (step E80).

Conversely, the identification of at least one abnormal image causes the crossing of a first alert level for detecting the ingestion of an object by the turbine engine (step E90).

Moreover, the abnormal image(s) of the operating fan are stored in another memory of the electronic computer (step E100) with view to being analyzed.

As illustrated in the flowchart of FIG. 3, the analysis of the abnormal images of the fan essentially consists of checking whether the abnormal images of the operating fan meet or not a certain number of criteria for viewing the ingestion of an object by the turbine engine and its consequences on the fan of the latter (step E110), of establishing a diagnosis depending on the checked criteria (step E120), and then of emitting an alert by the turbine engine on ingestion of one or more objects depending on the diagnosis(es) established beforehand (step E130).

The criteria to be checked during the step E110 are checked by means of particular algorithms for processing digital images applied by the electronic computer of the turbine engine and applied to the abnormal images of the operating fan. In particular, each criterion to be checked is parameterized and compared with thresholds from experience.

The criteria to be checked are distributed in several sets, i.e.: a set of criteria related to the viewing of an object in the turbine engine upstream from the fan, a set of criteria related to the viewing of a phenomenon of deformation of one or more blades of the fan, and a set of criteria related to the viewing of the extent and of the attenuation over time of the phenomenon of deformation of the blade(s) of the fan. These sets of criteria are detailed as follows.

Set of Criteria Related to the Viewing of an Object in the Turbine Engine Upstream from the Fan (i.e. in the Intake Duct)

Criterion 1: Group of Abnormal Pixels of the Analyzed Images

This criterion consists of checking whether the abnormal pixels (i.e. the pixels of the abnormal image which differ from those of the corresponding reference image) are grouped. If yes, the size T of the group(s) of abnormal pixels is calculated.

Criterion 2: Displacement of the Group(s) of Abnormal Pixels

This criterion consists of checking how this (these) group(s) of abnormal pixels move from one abnormal image to the abnormal image which follows in time. In particular, provision is made for calculating the consistence ct of the displacement trajectory of a group of abnormal pixels (this trajectory should logically be directed towards the fan), as well as its displacement speed vp (this speed should logically be consistent with the speed of the aircraft and the operating condition of the turbine engine).

Criterion 3: Deformation of the Blades

This criterion consists of checking by analyzing the image of the blades whether one or more of these blades are deformed (i.e. if they have undergone bending following the impact by an object ingested by the turbine engine while operating).

Set of Criteria Related to the Viewing of a Phenomenon of Deformation of One or More Blades of the Fan Criterion 4: Identification of the Blades of the Fan Affected by Deformation This criterion consists of identifying on the abnormal images the number of blades having undergone deformation following the impact of an object and of quantifying for each of them the maximum amplitude am of this deformation.

Criterion 5: Tracking the Blades Affected by Deformation

This criterion consists of carrying out for each deformed blade a follow-up over time (i.e. from one abnormal image to the abnormal image following in time) of the consistence of the deformation.

Set of Criteria Related to the Viewing of the Extent and Attenuation Over Time of the Phenomenon of Deformation of the Blade(s) of the Fan Criterion 6: Damping of the Blade Deformation Phenomenon This criterion consists of checking whether the phenomenon of deformations of the blade(s) impacted by an object is damped over time (the deformation should logically be damped). For this purpose, the algorithm applied for checking this criterion may resort to a database stemming from the experiment in which are listed impacts of reference objects (in terms of volume, mass and velocity) as well as the amplitudes of observed deformations and the time period for returning to normal (for example taking the form of a multiple of a turn of the fan). Depending on the deformation amplitudes am recorded during the criterion 4, the time for returning to the normal may be estimated and checked. During this time for returning to the normal, a decrescendo de of the deformation amplitudes of the blades may also be checked and compared with a threshold value sde.

Criterion 7: Disappearance of the Phenomenon of Deformation of the Blade(s) of the Fan.

This criterion consists in checking if the deformation phenomenon of the blades disappears and if yes after how much time has elapsed. This time for returning to the normal is recorded and compared to a threshold value sdu.

Criterion 8: Calculation of the Percentage of Blades of the Fan Affected by the Deformation Phenomenon.

This criterion consists of calculating on the abnormal images of the operating fan, the percentage of blades of the fan which are affected by deformation following the impact of an object.

Following step E110 for checking these criteria 1-8, provision is made during step E120, for establishing a diagnosis depending on the checked criteria.

The different possible diagnoses are selected depending on the checked criteria during step E110. Several diagnoses may be established for a same analysis. These diagnoses may be the following.

Diagnose in the Presence of the Turbine Engine Upstream from the Fan (i.e. in the Air Intake Duct) of One or More Objects, the Size and Velocity of which are Estimated This diagnosis A is established if the criteria 1-3 have been met. Moreover, this diagnosis comprises the size T of the object and its displacement velocity vp (these values have also been calculated during the checking of criteria 1-3).

Diagnosis of the Presence of One or More Blades of the Fan in Free and Damped Oscillations This diagnosis B is established if the criteria 4-7 have been met with de<sde and du<sdu.

Diagnosis of the Presence of One or More Blades of the Fan in Forced Oscillations.

This diagnosis C is established if the criteria 4, 5, 7 (with du>sdu) and 8 have been met.

Following step E120 for establishing one of these three diagnoses, provision is made during step E130, for emitting an alert of ingestion by the turbine engine of one or more objects for the maintenance.

The various possible alerts depend on diagnosis(es) established beforehand. A single alert is emitted for a same analysis. These alerts may be the following.

Alert of Ingestion by the Turbine Engine of an Object, the Size, the Mass and the Density of which are Identified This alert is emitted if diagnoses A and B have been established and if it was possible to ascertain on the abnormal images of the operating fan that the viewed object(s) in the inlet duct of the turbojet have disappeared. With this alert, it is possible to indicate to the maintenance that one or more FODs have been seen in the air intake duct with disappearance and that one or more blades have been deformed following this ingestion with damping and disappearance of the deformation phenomenon. This alert also comprises the size T of the ingested object.

Alert of Ingestion by the Turbine Engine an Object of Small Size and of High Density This alert is emitted if diagnosis B alone has been established. With this alert it is possible to indicate to the maintenance that one or more blades have been deformed following the ingestion of one or more FODs (which have not been seen in the air intake duct of the turbine engine because of their small size relative to the resolution of the camera). Typically, the ingested object having caused emission of such an alert may be a stone or a bolt for example.

Alert of Ingestion by the Turbine Engine of an Object of Small Size and Low Density This alert is emitted if diagnosis A alone has been established and if it was possible to ascertain on the abnormal images of the operating fan that the object(s) viewed in the intake duct of the turbine engine have disappeared. With this alert, it is possible to indicate to the maintenance that one or more FODs have been seen in the air intake duct but that the mass of these objects was not sufficient for generating deformation of the blades of the fan. Typically, the ingested object having caused the emission of such an alert may be a plastic bag or a piece of fabric for example.

The invention claimed is:

1. A method for detecting the ingestion of an object by an aircraft turbine engine during flight, the method comprising:
    installing a camera inside a nacelle of said turbine engine, said camera being aimed at a fan of said engine;
    connecting said camera to a computer on board of said aircraft, said computer being programmed to identify phases of flight of said aircraft and having on its resident memory a database of fan reference images characteristic to normal operation of said fan in each of said flight phases of said aircraft;
    acquiring, with said camera during flight, digital images of said fan, said images being acquired at an acquisition frequency proportional to the speed of rotation and number of blades of said fan;
    transmitting said images to said computer;
    comparing, using said computer, said acquired digital images with fan reference images corresponding to the same flight phases as said acquired images;
    selecting abnormal acquired images which differ from corresponding compared reference images; and
    identifying, based on said selecting of abnormal acquired images, an abnormal operation fan condition corresponding to an alert level caused by ingestion of an object by said turbine engine.

2. The method according to claim 1, further comprising:
analyzing the abnormal acquired images to check on the fan for a plurality of criteria for viewing the ingestion of the object by the turbine engine.

3. The method according to claim 2, wherein the plurality of criteria comprises:
a set of criteria related to the viewing of the object in the turbine engine upstream from the fan;
a set of criteria related to the viewing of a phenomenon of deformation of one or more blades of the fan; and
a set of criteria related to the viewing of the extent and of the attenuation over time of the deformation phenomenon of the blades of the fan.

4. The method according to claim 2, further comprising:
establishing a diagnosis depending on the checked criteria.

5. The method according to claim 4, wherein the established diagnosis belongs to the following list:
diagnosis of the presence in the turbine engine upstream from the fan of one or more objects for which the size and velocity are estimated;
diagnosis of the presence of one or more blades of the fan in free and damped oscillations;
diagnosis of the presence of one or more blades of the fan in forced oscillations.

6. The method according to claim 4, further comprising:
emitting an alert of ingestion by the turbine engine of one or more objects.

7. The method according to claim 6, wherein the emitted alert belongs to the following list:
alert of ingestion by the turbine engine of an object, the size, the mass and the density of which are identified;
alert of ingestion by the turbine engine of an object of small size and high density;
alert of ingestion by the turbine engine of an object of small mass and low density.

8. The method according to claim 6, wherein the analyzing the abnormal acquired images, establishing a diagnosis, and emitting an alert of ingestion steps are carried out on a deferred basis.

9. The method according to claim 1, wherein the acquiring, transmitting, comparing, selecting, and identifying steps are carried out continuously during the mission.

10. The method according to claim 1, wherein the frequency for acquiring digital images of the operating fan of the turbine engine is:

$$f_a = n_a \times \frac{N_1}{60}$$

wherein $n_a$ is the number of blades of the fan and $N_1$ is the speed of rotation of the fan.

11. The method according to claim 1, wherein said phases of flight of said aircraft are identified based on the speed of rotation of the fan and an altitude of the aircraft.

12. The method according to claim 1, wherein said comparing includes superposition of said acquired digital images on said fan reference images corresponding to the same flight phases as said acquired images.

13. A system for detecting the ingestion of an object by an aircraft turbine engine during flight, the system comprising:
a camera installed inside a nacelle of said turbine engine and aimed at a fan of said engine; and
a computer on board of said aircraft and connected to said camera, said computer being programmed to identify phases of flight of said aircraft and having on its resident memory a database of fan reference images characteristic to normal operation of said fan in each of said flight phases of said aircraft,
wherein said computer is programmed to:
acquire, with said camera during flight, digital images of said fan, said images being acquired at an acquisition frequency proportional to the speed of rotation and number of blades of said fan;
compare said acquired digital images with fan reference images corresponding to the same flight phases as said acquired images;
select abnormal acquired images which differ from corresponding compared reference images; and
identify, based on said selecting of abnormal acquired images, an abnormal operation fan condition corresponding to an alert level caused by ingestion of an object by said turbine engine.

14. The system according to claim 13, wherein the camera is a digital camera.

15. A turbine engine comprising a detection system according to claim 13.

* * * * *